United States Patent
Koseoglu et al.

(10) Patent No.: US 11,332,678 B2
(45) Date of Patent: May 17, 2022

(54) PROCESSING OF PARAFFINIC NAPHTHA WITH MODIFIED USY ZEOLITE DEHYDROGENATION CATALYST

(71) Applicants: Saudi Arabian Oil Company, Dhahran (SA); JGC Catalysts and Chemicals, Ltd., Kawasaki (JP); Japan Cooperation Center Petroleum, Tokyo (JP)

(72) Inventors: Omer Refa Koseoglu, Dhahran (SA); Ali H. Alshareef, Qatif (SA); Mitsunori Watabe, Kanagawa (JP); Koji Uchida, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

( * ) Notice: Subject to any disclaimer, the term of this patent is extended or adjusted under 35 U.S.C. 154(b) by 69 days.

(21) Appl. No.: 16/936,987

(22) Filed: Jul. 23, 2020

(65) Prior Publication Data
US 2022/0025276 A1    Jan. 27, 2022

(51) Int. Cl.
*C10G 35/095* (2006.01)
*B01J 29/08* (2006.01)
*B01J 29/16* (2006.01)

(52) U.S. Cl.
CPC .......... *C10G 35/095* (2013.01); *B01J 29/088* (2013.01); *B01J 29/166* (2013.01); *B01J 2229/183* (2013.01); *C10G 2300/1081* (2013.01); *C10G 2300/1096* (2013.01); *C10G 2300/301* (2013.01); *C10G 2300/70* (2013.01); *C10G 2400/02* (2013.01); *C10G 2400/20* (2013.01)

(58) Field of Classification Search
CPC .......... C10G 35/095; C10G 2300/1081; C10G 2300/1096; C10G 2300/301; C10G 2300/70; C10G 2400/02; C10G 2400/20; B01J 29/088; B01J 29/166; B01J 2229/183
USPC ........................................ 208/141
See application file for complete search history.

(56) References Cited

U.S. PATENT DOCUMENTS

| | | |
|---|---|---|
| 3,523,914 A | 8/1970 | Mitsche et al. |
| 3,842,138 A | 10/1974 | Chahvekilian et al. |
| 3,944,481 A | 3/1976 | Wing et al. |
| 4,002,556 A | 1/1977 | Satchel |
| 4,065,379 A | 12/1977 | Soonawala et al. |
| 4,115,467 A | 9/1978 | Fowler |
| 4,180,453 A | 12/1979 | Franck et al. |
| 4,210,560 A | 7/1980 | Kehl |
| 4,255,288 A | 3/1981 | Cull et al. |
| 4,419,271 A | 12/1983 | Ward |
| 4,698,322 A | 10/1987 | Santilli et al. |
| 4,738,941 A | 4/1988 | Dufresne et al. |
| 4,798,665 A | 1/1989 | Humbach et al. |
| 4,826,586 A | 5/1989 | Herbst et al. |
| 4,859,308 A | 8/1989 | Harandi et al. |
| 5,057,203 A | 10/1991 | Chu et al. |
| 5,185,484 A | 2/1993 | Del Rossi et al. |
| 5,192,421 A | 3/1993 | Audeh et al. |
| 5,258,117 A | 11/1993 | Kolstad et al. |
| 5,264,635 A | 11/1993 | Le et al. |
| 5,271,761 A | 12/1993 | Skeels et al. |
| 5,414,175 A | 5/1995 | Cook |
| 5,690,810 A | 11/1997 | Lawrence et al. |
| 5,906,728 A | 5/1999 | Iaccino et al. |
| 6,017,840 A | 1/2000 | Wu et al. |
| 6,063,944 A | 5/2000 | Di Renzo et al. |
| 6,132,494 A | 10/2000 | Tore et al. |
| 6,190,533 B1 | 2/2001 | Bradow et al. |
| 6,210,561 B1 | 4/2001 | Bradow et al. |
| 6,303,842 B1 | 10/2001 | Bridges et al. |
| 6,632,351 B1 | 10/2003 | Ngan et al. |
| 6,726,834 B2 | 4/2004 | Quesada et al. |

(Continued)

FOREIGN PATENT DOCUMENTS

| | | |
|---|---|---|
| CA | 2041905 A1 | 11/1991 |
| CN | 101134576 A | 3/2008 |

(Continued)

OTHER PUBLICATIONS

International Search Report and Written Opinion dated Apr. 9, 2021 pertaining to International application No. PCT/US2020/060860 filed Nov. 17, 2020, 12 pgs.

(Continued)

*Primary Examiner* — Brian A McCaig
(74) *Attorney, Agent, or Firm* — Dinsmore & Shohl LLP

(57) ABSTRACT

Methods for processing paraffinic naphtha include contacting a paraffinic naphtha feedstock with a catalyst system in a dehydrogenation reactor. The catalyst system includes a framework-substituted ultra-stable Y (USY)-type zeolite to produce a dehydrogenated product stream. The catalyst system includes a framework-substituted ultra-stable Y (USY)-type zeolite. The framework-substituted USY-type zeolite has a modified USY framework. The modified USY framework includes a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof. A dehydrogenation catalyst for dehydrogenating a paraffinic naphtha includes the framework-substituted ultra-stable Y (USY)-type zeolite.

19 Claims, No Drawings

(56) References Cited

U.S. PATENT DOCUMENTS

| | | |
|---|---|---|
| 6,762,143 B2 | 7/2004 | Shan et al. |
| 7,084,087 B2 | 8/2006 | Shan et al. |
| 7,220,887 B2 | 5/2007 | Stell et al. |
| 7,331,746 B2 | 2/2008 | Wright et al. |
| 7,408,093 B2 | 8/2008 | Stell et al. |
| 7,550,405 B2 | 6/2009 | Shan et al. |
| 7,700,005 B2 | 4/2010 | Inui et al. |
| 7,951,745 B2 | 5/2011 | Zhou et al. |
| 7,972,498 B2 | 7/2011 | Buchanan et al. |
| 8,002,970 B2 | 8/2011 | Euzen et al. |
| 8,008,226 B2 | 8/2011 | Inui et al. |
| 8,070,938 B2 | 12/2011 | Stein et al. |
| 8,071,833 B2 | 12/2011 | Grootjans et al. |
| 8,148,285 B2 | 4/2012 | Kuroda et al. |
| 8,884,088 B2 | 11/2014 | Smith et al. |
| 9,108,190 B1 | 8/2015 | Fan et al. |
| 9,221,036 B2 | 12/2015 | Koseoglu et al. |
| 9,321,704 B2 | 4/2016 | Lattner et al. |
| 9,499,403 B2 | 11/2016 | Al-Muhaish et al. |
| 9,512,371 B2 | 12/2016 | Abe et al. |
| 9,879,187 B2 | 1/2018 | Bhan |
| 9,908,109 B2 | 3/2018 | Ravishankar et al. |
| 10,053,401 B1 | 8/2018 | Beadle et al. |
| 10,081,009 B2 | 9/2018 | Koseoglu et al. |
| 10,137,442 B2 | 11/2018 | McGuire |
| 10,293,332 B2 | 5/2019 | Koseoglu et al. |
| 10,350,585 B1 | 7/2019 | Al-Herz et al. |
| 10,427,142 B1 | 10/2019 | Al-Herz et al. |
| 10,494,574 B2 | 12/2019 | Akah et al. |
| 10,941,354 B1 | 3/2021 | Hodgkins et al. |
| 2003/0006168 A1 | 1/2003 | Ino et al. |
| 2004/0004028 A1 | 1/2004 | Stell et al. |
| 2004/0045869 A1 | 3/2004 | Benazzi et al. |
| 2004/0054247 A1 | 3/2004 | Powers |
| 2005/0209093 A1 | 9/2005 | Chester et al. |
| 2005/0232839 A1 | 10/2005 | Yaluris et al. |
| 2005/0261530 A1 | 11/2005 | Stell et al. |
| 2006/0021912 A1 | 2/2006 | Chen et al. |
| 2007/0090018 A1 | 4/2007 | Keusenkothen et al. |
| 2007/0090020 A1 | 4/2007 | Buchanan et al. |
| 2007/0232846 A1 | 10/2007 | Baumgartner et al. |
| 2009/0283443 A1 | 11/2009 | Kuroda et al. |
| 2010/0087692 A1 | 4/2010 | Yoshimura et al. |
| 2011/0042269 A1 | 2/2011 | Kuechler et al. |
| 2011/0132804 A1 | 6/2011 | Stevenson et al. |
| 2011/0174682 A1 | 7/2011 | Iaccino |
| 2011/0247500 A1 | 10/2011 | Akhras et al. |
| 2011/0251049 A1 | 10/2011 | Kuroda et al. |
| 2012/0085681 A1 | 4/2012 | Abe et al. |
| 2013/0046122 A1 | 2/2013 | Vermeiren et al. |
| 2013/0066131 A1 | 3/2013 | Harris |
| 2013/0175202 A1 | 7/2013 | Koseoglu et al. |
| 2013/0299388 A1 | 11/2013 | Bulut et al. |
| 2013/0319910 A1 | 12/2013 | Koseoglu et al. |
| 2015/0111721 A1 | 4/2015 | Tian et al. |
| 2015/0111722 A1 | 4/2015 | Long et al. |
| 2015/0375218 A1 | 12/2015 | Koseoglu et al. |
| 2017/0088490 A1 | 3/2017 | Chen et al. |
| 2019/0093028 A1 | 3/2019 | Gong et al. |
| 2019/0316044 A1 | 10/2019 | Koseoglu et al. |
| 2020/0055025 A1 | 2/2020 | Kukade et al. |

FOREIGN PATENT DOCUMENTS

| | | |
|---|---|---|
| CN | 101898144 A | 12/2010 |
| CN | 104549543 A | 4/2015 |
| CN | 106140289 A | 11/2016 |
| CN | 106145136 A | 11/2016 |
| EP | 703003 A1 | 3/1996 |
| EP | 2298445 A1 | 3/2011 |
| EP | 3406337 A1 | 11/2018 |
| GB | 1255544 A | 12/1971 |
| GB | 2114594 A | 8/1983 |
| JP | 58098387 A | 6/1983 |
| JP | 07308581 A | 11/1995 |
| JP | 2000334305 A | 12/2000 |
| JP | 2002255537 A | 9/2002 |
| JP | 2003226519 A | 8/2003 |
| WO | 8801254 A1 | 2/1988 |
| WO | 0104237 A2 | 1/2001 |
| WO | 2007047942 A2 | 4/2007 |
| WO | 2009088413 A1 | 7/2009 |
| WO | 2012018819 A1 | 2/2012 |
| WO | 2013057319 A2 | 4/2013 |
| WO | 2013123299 A1 | 8/2013 |
| WO | 2015179735 A1 | 11/2015 |
| WO | 2019147345 A1 | 8/2019 |

OTHER PUBLICATIONS

International Search Report and Written Opinion dated Apr. 13, 2021 pertaining to International application No. PCT/US2020/066520 filed Dec. 22, 2020, 12 pgs.

International Search Report and Written Opinion dated Apr. 21, 2021 pertaining to International application No. PCT/US2020/058208 filed Oct. 30, 2020, 12 pgs.

U.S. Notice of Allowance and Fee(s) Due dated Nov. 9, 2021 pertaining to U.S. Appl. No. 16/936,990, filed Jul. 23, 2020, 20 pages.

U.S. Office Action dated Jul. 6, 2021 pertaining to U.S. Appl. No. 16/936,990, filed Jul. 23, 2020, 35 pages.

U.S. Office Action dated Jul. 8, 2021 pertaining to U.S. Appl. No. 16/923,346, filed Jul. 8, 2020, 35 pages.

U.S. Notice of Allowance and Fee(s) Due dated Aug. 4, 2021 pertaining to U.S. Appl. No. 16/940,635, filed Jul. 28, 2020, 42 pages.

U.S. Office Action dated Aug. 6, 2021 pertaining to U.S. Appl. No. 16/940,711, filed Jul. 28, 2020, 40 pages.

International Search Report pertaining to Application No. PCT/US2015/032129 dated Aug. 21, 2015.

Wang et al., "Characterization of titanium-modified USY zeolites and their catalytic performance on n-heptane cracking", Appl Catal A-Gen, vol. 214, No. 2, pp. 167-177, Jun. 29, 2001.

International Search Report pertaining to Application No. PCT/US2013/023337 dated Jun. 18, 2013.

International Search Report pertaining to Application No. PCT/US2018/064001 dated Feb. 18, 2019.

Hamdy et al., "Structural and photocatalytic properties of precious metals modified TiO2-BEA Zeolite composites", Molecular Catalysis, vol. 441, pp. 140-149, 2017.

Rakshe et al., "Acidity and m-Xylene Isomerization Activity of Large Pore, Zirconium-Containing Alumino-silicate with BEA Structure", Journal of Catalysis, vol. 188, pp. 252-260, 1999.

Reddy et al., "A Simple Method for the Preparation of Active Ti Beta Zeolite Catalysts", Catalysisby Microporous Materials, Studies int eh Surface Science and Catalysis, vol. 94, pp. 309-316, 1995.

International Search Report and Written Opinion dated Mar. 31, 2021 pertaining to International application No. PCT/US2020/057484 filed Oct. 27, 2020, 14 pgs.

Notice of Allowance and Fee(s) Due dated Jun. 9, 2021 pertaining to U.S. Appl. No. 16/985,588, filed Aug. 5, 2020, 35 pages.

International Search Report and Written Opinion dated Mar. 17, 2021 pertaining to International application No. PCT/US2020/058682 filed Nov. 3, 2020, 16 pgs.

International Search Report and Written Opinion dated Sep. 10, 2021 pertaining to International application No. PCT/US2021/034220 filed May 26, 2021, 14 pages.

Sun, X. et al. "Synthesis of Zeolite B and Its Performance in Catalytic Cracking", Journal of Chemical Engineering of Japan, vol. 42, No. 10, Jan. 1, 2009, pp. 760-766.

U.S. Office Action dated Feb. 4, 2022 pertaining to U.S. Appl. No. 16/940,711, filed Jul. 28, 2020, 23 pages.

U.S. Office Action dated Feb. 14, 2022 pertaining to U.S. Appl. No. 16/923,346, filed Jul. 8, 2020, 22 pages.

PROCESSING OF PARAFFINIC NAPHTHA WITH MODIFIED USY ZEOLITE DEHYDROGENATION CATALYST

TECHNICAL FIELD

This disclosure relates generally to processes for upgrading of paraffinic naphtha streams and, more particularly, to dehydrogenation of paraffinic naphthas in the presence of zeolite catalyst systems.

BACKGROUND

Light naphtha is a product of petroleum refineries or gas plants primarily containing paraffinic hydrocarbons having five or six carbon atoms. The transformation of light naphtha into value-added gasoline blending components has been an ongoing challenge. In conventional refineries light naphtha is isomerized to produce isomerate, a gasoline blending component having an acceptable octane number and high vapor pressure. In petrochemical complexes light naphtha is steam cracked under severe conditions to produce olefins such as ethylene, propylene, and butenes. Olefins such as ethylene, propylene, and butenes have higher value than the C5 and C6 hydrocarbons of light naphtha, because they are building blocks to other valuable hydrocarbons.

The inertness of carbon-carbon and carbon-hydrogen bonds in the hydrocarbon components of the light naphtha results in unfavorable thermodynamics, needs for elevated processing temperatures, low selectivity and yields, and high cost for commercial applications. Refiners continue to process greater amounts of lighter feeds such as shale oil and condensates. Moreover, the ever increasing global gasoline demand can benefit from products derived from light naphtha. Therefore, there are ongoing needs for cost-effective processes that convert light naphtha to hydrocarbons suitable as gasoline blending components or as building blocks for other valuable hydrocarbons.

SUMMARY

Example embodiments of this disclosure are directed to a dehydrogenation catalyst for dehydrogenating a paraffinic naphtha. The dehydrogenation catalyst includes a framework-substituted ultra-stable Y (USY)-type zeolite. The framework-substituted USY-type zeolite has a modified USY framework. The modified USY framework includes a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof.

Further embodiments of this disclosure are directed to methods for processing or dehydrogenating paraffinic naphtha. The methods include contacting a paraffinic naphtha feedstock with a catalyst system in a dehydrogenation reactor. The catalyst system includes a framework-substituted ultra-stable Y (USY)-type zeolite to produce a dehydrogenated product stream. The framework-substituted USY-type zeolite has a modified USY framework. The modified USY framework includes a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof.

Additional features and advantages of the embodiments of this disclosure will be set forth in the detailed description that follows, and in part will be readily apparent to those skilled in the art from that description or recognized by practicing the embodiments described herein, including the detailed description and claims that follow. It is to be understood that both the foregoing general description and the following detailed description describe various embodiments and are intended to provide an overview or framework for understanding the nature and character of the claimed subject matter.

DETAILED DESCRIPTION

Embodiments of the present disclosure include a dehydrogenation catalyst and the use of the dehydrogenation catalyst for dehydrogenating paraffinic naphthas, whereby a dehydrogenated product stream is formed in which a portion of the paraffinic naphthas have been at least partially dehydrogenated. The dehydrogenation catalyst according to embodiments includes a framework-substituted ultra-stable Y (USY)-type zeolite having a modified USY framework. The modified USY framework is a USY aluminosilicate framework modified by substituting a portion of framework aluminum atoms of the USY aluminosilicate framework with substitution atoms. In embodiments, the substitution atoms are independently selected from the group consisting of titanium atoms, zirconium atoms, hafnium atoms, and combinations thereof.

Reference will now be made in detail to embodiments of methods for processing paraffinic naphthas to produce dehydrogenated product streams in which at least a portion of the paraffinic naphthas have been at least partially dehydrogenated.

According to embodiments, methods for processing paraffinic naphtha include contacting a paraffinic naphtha feedstock with a catalyst system in a dehydrogenation reactor to produce a dehydrogenated product stream. The catalyst system includes a framework-substituted ultra-stable Y (USY)-type zeolite having a modified USY framework. The modified USY framework is an analog to a USY aluminosilicate framework according to the standard definition of a USY aluminosilicate framework. According to the standard definition, USY aluminosilicate framework is that of an aluminosilicate zeolite having a crystal lattice constant (UD) of 2.430 nm or more and 2.450 nm or less, a specific surface area of 600 $m^2/g$ to 900 $m^2/g$, and a molar ratio of silicon to aluminum from 20 to 100, as calculated on the basis of silica ($SiO_2$) and alumina ($Al_2O_3$).

With regard to the framework-substituted USY-type zeolite according to embodiments of this disclosure, the modified USY framework is a USY aluminosilicate framework modified by substituting a portion of framework aluminum atoms of the USY aluminosilicate framework with substitution atoms. In embodiments, the substitution atoms are independently selected from the group consisting of titanium atoms, zirconium atoms, hafnium atoms, and combinations thereof.

As used in this disclosure, the term "Ti-USY" refers to a framework-substituted USY-type zeolite according to embodiments, in which the substitution atoms are titanium. Likewise, the term "Zr-USY" refers to a framework-substituted USY-type zeolite according to embodiments, in which the substitution atoms include zirconium. The term "Hf-USY" refers to a framework-substituted USY-type zeolite according to embodiments, in which the substitution atoms include hafnium. The term "(Ti,Zr)-USY" refers to a framework-substituted USY-type zeolite according to embodiments, in which the substitution atoms include titanium and zirconium. The term "(Ti,Hf)-USY" refers to a framework-substituted USY-type zeolite according to embodiments, in which the substitution atoms include titanium and hafnium. The term "(Zr,Hf)-USY" refers to a framework-substituted USY-type zeolite according to embodiments, in which the substitution atoms include zirconium and hafnium. The term "(Ti,Zr,Hf)-USY" refers to a framework-substituted USY-type zeolite according to embodiments, in which the substitution atoms include titanium, zirconium, and hafnium.

The catalyst system of embodiments, including the framework-substituted USY-type zeolite and its preparation, will now be described in greater detail. The incorporation of the catalyst system in the methods for processing paraffinic naphtha will be described subsequently.

Catalyst with Framework-Substituted Ultra Stable Y (USY) Zeolite

As previously described, in embodiments of methods for processing paraffinic naphtha, the catalyst system includes the framework-substituted USY-type zeolite that has a USY aluminosilicate framework in which a part of framework aluminum atoms are substituted with titanium atoms, zirconium atoms, hafnium atoms, or any combination thereof. The framework-substituted USY-type zeolite may be Ti-USY, Zr-USY, Hf-USY, (Ti,Zr)-USY, (Ti,Hf)-USY, (Zr,Hf)-USY, or (Ti,Zr,Hf)-USY, as previously defined. The substitution atoms are substituted for the aluminum atoms forming a framework of the ultra-stable Y-type zeolite and, therefore, serve as constituents of the framework of the ultra-stable Y-type zeolite. Substitution can be verified by analytical techniques including, but not limited to, ultraviolet, visible, and near-infrared spectrophotometry (UV-Vis-NIR), Fourier-transform infrared spectroscopy (FT-IR), or nuclear magnetic resonance spectrometry (NMR).

In some embodiments, the framework-substituted USY-type zeolite includes from 0.01% to 5% by mass, or from 0.1% to 5% by mass, or from 0.2% to 4% by mass, or from 0.3% to 3% by mass substitution atoms, calculated on an oxide basis, based on the total mass of the framework-substituted USY-type zeolite. In calculations on oxide basis, titanium atoms are calculated on the basis of $TiO_2$, zirconium atoms are calculated on the basis of $ZrO_2$, and hafnium atoms are calculated on the basis of $HfO_2$. Titanium, zirconium, and hafnium in the framework-substituted USY-type zeolites may be quantitatively determined by known techniques, such as by X-ray fluorescence analysis, high-frequency plasma emission spectrometry, or atomic absorption spectrometry, for example.

In some embodiments, in addition to the aluminum-framework-substituted substitution atoms, the framework-substituted USY-type zeolite may further include zirconium atoms, titanium atoms, hafnium atoms, or any combination thereof, attached to, or carried on the outside of, or combined with the framework of the framework-substituted USY-type zeolite. In such embodiments, the zirconium, titanium, or hafnium atoms may be attached as oxide particles such as titania particles, zirconia particles, or hafnia particles. The oxide particles may have particle diameters of 50 nm or less. For the purpose of facilitating quantitative analysis, as contemplated herein, the amounts by mass of substitution atoms in the framework-substituted USY-type zeolite includes the total amount of titanium, zirconium, and hafnium, calculated on an oxide basis and based on the total mass of the framework-substituted USY-type zeolite that is either substituted for framework aluminum atoms or attached to, or carried on the outside of, or combined with the zeolite framework. It should be understood, however, that in all embodiments, at least a portion of the framework aluminum atoms of the USY aluminosilicate framework are substituted with titanium atoms, zirconium atoms, hafnium atoms, or any combination thereof. In example embodiments, greater than 50%, or greater than 75%, or greater than 90%, or greater than 99% of the titanium, zirconium, and hafnium atoms present in the framework-substituted USY-type zeolite are substituted for framework aluminum atoms in the zeolite framework and are not merely attached to, or carried on the outside of, or combined with the zeolite framework, particularly as particles.

It should be appreciated by a person of skill in the art, that when the framework-substituted USY-type zeolite contains a combination of substitution atoms, as in (Ti,Zr)-USY, (Ti,Hf)-USY, (Zr,Hf)-USY, or (Ti,Zr,Hf)-USY, the mass ratios of the individual types of substitution atoms in each zeolite, as calculated on an oxide basis, is not restricted. Though the reactions described in the methods according to embodiments may be tuned by adjusting ratios of titanium to zirconium to hafnium, it should be understood that any ratio of titanium to zirconium to hafnium may be effective to carry out the methods for processing paraffinic naphtha according to this disclosure.

In one specific, non-limiting embodiment, the framework-substituted USY-type zeolite may include from 0.01% to 5% by mass substitution atoms, as calculated on an oxide basis, based on the total mass of the framework-substituted USY-type zeolite is a (Ti,Zr)-USY zeolite, in which the substitution atoms include titanium atoms and zirconium atoms.

According to embodiments, the framework-substituted USY-type zeolites may exhibit a greater amount of acidity than a comparative non-substituted USY-type zeolite having an identical ratio of silica sites to alumina sites. It should be understood that the ratio of silica sites to alumina sites in the comparative non-substituted USY-type zeolite is equivalent to the silica to alumina ratio, as measured by conventional techniques. With regard to the framework-substituted USY-type zeolites, however, the ratio of silica sites to alumina sites is calculated such that the number of silica sites is determined by conventional analysis, whereas the number of alumina sites includes both the number of actual alumina sites and the number of framework-substituted alumina sites in which an aluminum atom has been replaced by titanium, zirconium, or hafnium.

Preparation of the Framework-Substituted USY-Type Zeolite

The framework-substituted USY-type zeolite in the catalyst system may be prepared by any zeolite preparation method that results in a framework-substituted USY-type zeolite that has a USY aluminosilicate framework in which a part of framework aluminum atoms are substituted with titanium atoms, zirconium atoms, hafnium atoms, or any combination thereof. In one example preparation technique, the framework-substituted USY-type zeolite in the catalyst system may be produced by calcining a USY-type zeolite at 500° C. to 700° C., the USY-type zeolite having a crystal lattice constant of 2.430 nm to 2.450 nm, a specific surface area of 600 $m^2/g$ to 900 $m^2/g$, and a molar ratio of silica to alumina of 20 to 100. Then, a suspension is formed containing the calcined USY-type zeolite. The suspension may have a liquid/solid mass ratio of 5 to 15. An inorganic acid or an organic acid is added to the suspension to decrease the pH of the suspension to from 1.0 to 2.0. The pH of the suspension is controlled in advance to 1.0 to 2.0 to prevent precipitation during mixing of one or more additional solution. Specifically, one or more additional solutions containing a compound of zirconium, titanium, hafnium, or combinations thereof is mixed into the suspension to cause framework substitution at aluminum sites. The suspension then is neutralized with a base such as aqueous ammonia, for example, to increase the pH to a range from 7 to 7.5. The resulting framework-substituted USY-type zeolite may be filtered, washed with water, and dried at a drying temperature from 80° C. to 180° C., for example.

In the framework-substituted USY-type zeolite, extraskeletal aluminum (aluminum atoms that are not part of the zeolite framework) may be removed from the ultra-stable Y-type zeolite raw material to obtain the ultra-stable Y-type zeolite. Extraskeletal aluminum may be removed by, for example, dispersing the ultra-stable Y-type zeolite in warm water of 40° C. to 95° C. to prepare a suspension, and adding sulfuric acid to the suspension and stirring the suspension for 10 minutes to 3 hours while maintaining the temperature at 40° C. to 95° C. to thereby dissolve the extraskeletal aluminum. After dissolving the extraskeletal aluminum, the suspension is filtrated, and a residue on the filter is washed with purified water of 40° C. to 95° C. and dried at 100° C. to 180° C. for 3 hours to 30 hours, whereby an ultra-stable Y-type zeolite from which the extraskeletal aluminum is removed can be obtained.

In the preparation of the framework-substituted USY-type zeolite, the ultra-stable Y-type zeolite raw material may be calcined at 500° C. to 700° C. or 550° C. to 650° C. The calcining time is not specifically limited, as long as the framework-substituted USY-type zeolite is obtained. Example calcining times may be from 30 minutes to 10 hours. In respect to a calcining atmosphere of the USY-type zeolite raw material, it is carried out preferably in the air. The calcined USY-type zeolite raw material is suspended in water having a temperature of from 20° C. to 30° C. to form a suspension. With respect to the concentration of the suspension of the USY-type zeolite, the liquid/solid mass ratio may be from 5 to 15, or from 8 to 12, for example.

Non-limiting examples of inorganic acids for decreasing the pH of the suspension in the preparation of the framework-substituted USY-type zeolite may include sulfuric acid, nitric acid, or hydrochloric acid. Examples of organic acids for decreasing the pH of the suspension in the preparation of the framework-substituted USY-type zeolite may include carboxylic acids. Amounts of the inorganic acid or the organic acid are not limited, as long as a pH of the suspension can be controlled to a range of 1.0 to 2.0. Non-limiting example amounts of acid include molar amounts of acid from 0.5 to 4.0 times, or from 0.7 to 3.5 times the molar amount of alumina in the framework-substituted USY-type zeolite.

Non-limiting examples of the titanium compound present in the additional solution mixed into the suspension during preparation of the framework-substituted USY-type zeolite include titanium sulfate, titanium acetate, titanium chloride, titanium nitrate, titanium lactate, and any compound of titanium having sufficient solubility in the suspension to cause titanium atoms to replace aluminum atoms in the zeolite framework. In embodiments, an aqueous solution of a titanium compound prepared by dissolving the titanium compound in water is suitably used as the titanium compound.

Non-limiting examples of the zirconium compound present in the additional solution mixed into the suspension during preparation of the framework-substituted USY-type zeolite include zirconium sulfate, zirconium nitrate, zirconium chloride, and any compound of zirconium having sufficient solubility in the suspension to cause zirconium atoms to replace aluminum atoms in the zeolite framework. In embodiments, an aqueous solution of a zirconium compound prepared by dissolving the zirconium compound in water is suitably used as the zirconium compound.

Non-limiting examples of the hafnium compound present in the additional solution mixed into the suspension during preparation of the framework-substituted USY-type zeolite include hafnium chloride, hafnium nitrate, hafnium fluoride, hafnium bromide, hafnium oxalate, and any compound of hafnium having sufficient solubility in the suspension to cause hafnium atoms to replace aluminum atoms in the zeolite framework. In embodiments, an aqueous solution of a hafnium compound prepared by dissolving the hafnium compound in water is suitably used as the hafnium compound.

In the preparation of the framework-substituted USY-type zeolite, when mixing an aqueous solution of the zirconium compound, the hafnium compound, or the titanium compound with the suspension of the ultra-stable Y-type zeolite, the aqueous solution may be gradually added to the suspension. After the addition of the aqueous solution to the suspension is completed, the solution may be mixed by stirring at, for example, room temperature (25° C.±10° C.) for 3 hours to 5 hours. Further, after the mixing is completed, the mixed solution described above is neutralized by adding an alkali such as aqueous ammonia so that a pH thereof is controlled to 7.0 to 7.5, whereby the framework-substituted zeolite in the catalyst can be obtained.

It should be apparent to a person of skill in the art that, when only the zirconium compound (or an aqueous solution thereof) is used as the compound (or an aqueous solution thereof) added to the suspension described, the framework-substituted USY-type zeolite for use in the catalyst system will be Zr-USY. Likewise, when only the hafnium compound (or an aqueous solution thereof) is used, the USY-type zeolite for use in the catalyst system will be Hf-USY). When only the titanium compound (or an aqueous solution thereof) is used, USY-type zeolite for use in the catalyst system will be Ti-USY. When the zirconium compound and the titanium compound (or aqueous solutions thereof) are used, the framework-substituted USY-type zeolite for use in the catalyst system will be (Ti,Zr)-USY. When the zirconium compound and the hafnium compound (or aqueous solutions thereof) are used, the framework-substituted USY-type zeolite for use in the catalyst system will be (Zr,Hf)-USY. When the zirconium compound, the titanium compound, and the hafnium compound (or aqueous solutions thereof) are used, framework-substituted USY-type zeolite for use in the catalyst system will be (Ti,Zr,Hf)-USY.

The catalyst system of the methods according to embodiments may further include a support for the framework-substituted USY-type zeolite. The support may include an inorganic oxide excluding the above framework-substituted USY-type zeolite. The inorganic oxide of the support may further include a substance serving as a granulating agent or a binder. Any substance that is contained in any known zeolite catalyst support including as a granulating agent may be used. Examples of such inorganic oxides include, but are not limited to alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia. In example embodiments, the catalyst system includes as a support an inorganic oxide chosen from alumina and silica-alumina. Silica-alumina supports may be amorphous. In further example embodiments, the catalyst system may include an alumina binder.

In embodiments for which the catalyst system includes both the framework-substituted USY-type zeolite and the support, the weight ratios of the zeolite and the support may vary according to the desired level of catalyst activity. In example embodiments, the catalyst system may include from 1% to 80% by mass, from 10% to 80% by mass, or from 20% to about 70% by mass, based on the total mass of the catalyst system. Likewise, the catalyst system may include a catalyst support composing from 20% to 92% by mass, or from 20% to 90% by mass, or from 30% to 80% by mass, based on the total mass of the catalyst system.

The catalyst system of the methods according to embodiments may further include active metal components selected from individual metals or combinations of metals from IUPAC Groups 7 to 11 of the Periodic Table. Examples of active metals include iron, cobalt, nickel, rhodium, palladium, silver, iridium, platinum, gold, chromium, molybdenum, and tungsten. Non-limiting examples of combinations of metal components include combinations of molybdenum and tungsten; combinations of cobalt and nickel; and combinations of any one or more of molybdenum, tungsten, cobalt, or nickel with a platinum-group metal such as platinum, rhodium, or palladium. In example embodiments, the catalyst system may include least one active-phase metal chosen from nickel, molybdenum, tungsten, platinum, palladium, and combinations thereof. Without intent to be bound by theory, it is believed that the framework substitution of titanium, zirconium, or hafnium for aluminum in the framework-substituted USY-type zeolite according to embodiments may facilitate a greater amount of active-metal distribution on surfaces of the zeolite catalyst.

When a metal component is included in the catalyst system, the catalyst system may contain from greater than zero to about 40% by mass metal component, calculated on an oxide basis for oxide components or on a metal basis for metals, based on the total mass of the catalyst system. In example embodiments, the catalyst system may include from 3% to 30% by mass of a metal component such as molybdenum, tungsten, cobalt, or nickel, calculated on an oxide basis, based on the total mass of the catalyst system. In further example embodiments, the catalyst system may include from 0.01% to 2% by mass of a metal component chosen from platinum, rhodium, or palladium, calculated on a metal basis, based on the total mass of the catalyst system.

Processing of Paraffinic Naphtha to Produce Dehydrogenated Process Streams

In embodiments of methods for processing paraffinic naphtha, a paraffinic naphtha feedstock is contacted with the catalyst system in a dehydrogenation reactor to produce a dehydrogenated product stream. The catalyst system has been described in detail in the previous section. The processing method including the catalyst system as an integral component will now be described.

As used herein, the term "C5 paraffin" means an alkane having five carbon atoms. Likewise, the term "C6 paraffin" means an alkane having six carbon atoms.

As used herein, the term "olefin" in some circumstances refers to a carbon-carbon double bond or to a hydrocarbon containing at least one carbon-carbon double bond. In some specific circumstances, however, the term "olefins," particularly when stated in the context of dehydrogenation products of C5 and C6 paraffins, encompasses alkenes having five or six carbon atoms (such as 1-pentene, 2-pentene, 1,3-pentadiene, 1,4-pentadiene, 1-hexene, 2-hexene, 3-hexene, 1,3-hexadiene, 1,4-hexadiene, 1,5-hexadiene, 2,4-hexadiene, and 1,3,5-hexatriene) and also alkenes having fewer than five carbon atoms that result from cracking of C5 and C6 paraffins during a dehydrogenation process (such as ethylene, propylene, 2-methylpropene, 1-butene, cis-2-butene, trans-2-butene, and 1,3-butadiene).

As used herein, the terms "naphthenes" and "cycloalkanes" are equivalent and, in the context of dehydrogenation products of C5 and C6 paraffins, refer to cyclic alkanes having six or fewer carbon atoms. Examples of naphthenes and cycloalkanes in the context of dehydrogenation products of C5 and C6 paraffins include cyclopentane, methylcyclopentane, and cyclohexane. Dehydrogenation products of alkanes having seven carbon atoms may include cycloheptane, methyl cyclohexane, and dimethyl cyclopentane, for example.

According to some embodiments, the paraffinic naphtha feedstock is a hydrocarbon stream containing alkanes having from 2 to 16 carbon atoms. According to further embodiments the paraffinic naphtha feedstock may be a hydrocarbon stream containing as a major fraction alkanes having from 2 to 14 carbon atoms, from 2 to 12 carbon atoms, from 2 to 10 carbon atoms, from 3 to 8 carbon atoms, from 4 to 7 carbon atoms, from 5 to 12 carbon atoms, from 5 to 10 carbon atoms, from 5 to 7 carbon atoms, or from 5 to 6 carbon atoms. In further embodiments, the paraffinic naphtha feedstock may contain a total of at least 80% by weight, at least 90% by weight, or at least 95% by weight C5 and C6 alkanes, based on the total weight of the paraffinic naphtha feedstock. In some embodiments, the paraffinic naphtha feedstock may be a paraffin-rich hydrocarbon oil having a boiling-point range from 36° C. to 175° C. and containing or consisting essentially of alkanes having from 5 to 10 carbon atoms.

According to embodiments, the paraffinic naphtha feedstock is processed by contacting the paraffinic naphtha feedstock with the catalyst systems previously described in this disclosure to result in a reaction such as dehydrogenation. The reaction may be carried out as a batch reaction or a continuous reaction in a reactor. As used in this disclosure, a "reactor" refers to a vessel in which one or more chemical reactions may occur between one or more reactants optionally in the presence of one or more catalysts. Likewise, a "dehydrogenation reactor" is any reactor in which dehydrogenation occurs. Examples of reactors include tanks or tubular reactors configured to operate as a batch reactor, a continuous stirred-tank reactor (CSTR), or a plug flow reactor. Example reactors include packed bed reactors such as fixed bed reactors, ebullated-bed reactors, moving-bed reactors, and fluidized bed reactors.

The paraffinic naphtha feedstock may be contacted with the catalyst system previously described, in any suitable manner based on the configuration of the dehydrogenation reactor to cause the catalyst system to catalyze a dehydrogenation of at least a portion of the alkanes in the paraffinic naphtha feedstock to produce a dehydrogenated product stream. The dehydrogenated product stream may include dehydrogenation products of C5 and C6 alkanes. The dehydrogenation products of C5 and C6 alkanes may include a combination of olefins (1-pentene, 2-pentene, 1,3-pentadiene, 1,4-pentadiene, 1-hexene, 2-hexene, 3-hexene, 1,3-hexadiene, 1,4-hexadiene, 1,5-hexadiene, 2,4-hexadiene, and 1,3,5-hexatriene), naphthenes (cyclopentane, methylcyclopentane, and cyclohexane), aromatic compounds (for example, benzene and cyclopentadiene), normal alkanes (n-alkanes) (for example, pentane and hexane), iso-alkanes (for example, 2-methylbutane and 2-methylpentane), and hydrogen gas as a by-product of the dehydrogenation reactions. It should be understood that during dehydrogenation, hydrogen atoms are removed from alkanes to form mixed radical species that may result in further reactions such as cracking, isomerization, cyclization, and aromatization. Therefore, the dehydrogenated product stream may be expected to include a mixture of the products of such further reactions. Examples of such products include, but are not necessarily limited to, olefins with fewer than five carbon atoms (for example, ethylene, propylene, butylene, and 1,3-butadiene), normal alkanes with fewer than five carbon atoms (for example, methane, ethane, propane, butane), and iso-alkanes with fewer than five carbon atoms (for example, 2-methylpropane).

In embodiments of this disclosure, the dehydrogenated product stream may include greater than 5% by weight olefins having six or fewer carbon atoms, or greater than 10% by weight olefins having six or fewer carbon atoms, or greater than 20% by weight olefins having six or fewer carbon atoms, or greater than 30% by weight olefins having six or fewer carbon atoms, or greater than 40% by weight olefins having six or fewer carbon atoms, or greater than 50% by weight olefins having six or fewer carbon atoms, based on the total weight of the dehydrogenated product stream. It should be understood that, when the paraffinic naphtha feedstock is a fraction containing primarily C5 and C6 alkanes, the olefins in the dehydrogenated product stream will include ethylene, propylene, 1-butene, cis-2-butene, trans-2-butene, and 1,3-butadiene. Thus, in some embodiments, the dehydrogenated product stream may include greater than 5% by weight olefins, or greater than 10% by weight olefins, or greater than 20% by weight olefins, or greater than 30% by weight olefins, or greater than 40% by weight olefins, or greater than 50% by weight olefins, based on the total weight of the dehydrogenated product stream, where the olefins are selected from the group consisting of ethylene, propylene, 1-butene, cis-2-butene, trans-2-butene, 1,3-butadiene, and combinations thereof. Without intent to be bound by theory, it is believed that the catalyst systems described according to embodiments of this disclosure have beneficial selectivity toward increasing the weight fraction of olefins in the dehydrogenated product stream, relative to the weight fractions of normal alkanes, iso-alkanes, cycloalkanes, and aromatics.

In embodiments of methods for processing paraffinic naphtha, dehydrogenation conditions may include a reaction temperature from 300° C. to 800° C. and a reaction pressure from 0.01 kg/cm$^2$ to 30 kg/cm$^2$. For example, the reaction temperature may be from 300° C. to 700° C., from 400° C. to 700° C., from 400° C. to 650° C., from 450° C. to 650° C., from 450° C. to 600° C., or any subrange of these. The reaction pressure may be, for example, from 0.1 kg/cm$^2$ to 30 kg/cm$^2$, from 1 kg/cm$^2$ to 30 kg/cm$^2$, from 1 kg/cm$^2$ to 25 kg/cm$^2$, from 1 kg/cm$^2$ to 20 kg/cm$^2$, or any subrange of these. In example embodiments, the contacting of the paraffinic naphtha feedstock with the catalyst system may be conducted under conditions of a reaction temperature from 450° C. to 600° C.; a reaction pressure from 1 kg/cm$^2$ to 20 kg/cm$^2$ or from 2 kg/cm$^2$ to 6 kg/cm$^2$; a liquid hourly space velocity (LHSV) from 0.5 h$^{-1}$ to 5 h$^{-1}$; and a hydrogen to hydrocarbon mole ratio from 1 to 5.

Without being bound by any particular theory, it is believed that since the dehydrogenation of hydrocarbons is an endothermic reaction and conversion levels are limited by chemical equilibrium, it may be desirable to operate at relatively high temperatures and relatively low hydrogen partial pressures in order to achieve greater conversion. However, for reactions under severe conditions it may be difficult to maintain high activity and selectivity for long periods of time because undesirable side reactions such as aromatization, cracking, isomerization, coke formation, or combinations thereof, may increase. Therefore, reaction conditions may be selected with regard to maximizing one or more of catalytic activity, catalytic selectivity, and catalyst stability.

According to one or more embodiments presently described, the catalyst systems may have one or more of relatively high activity for the conversion of the previously described reactant chemical species, relatively high selectivity conversion to straight-chained alkenes (for example, olefins such as ethylene, propylene, 2-methylpropene, 1-butene, cis-2-butene, trans-2-butene, and 1,3-butadiene), and relatively good stability. As described presently, activity is a measure of a catalyst's ability to convert reactant materials into products (substances with different chemical compositions from the reactant materials) at a specified temperature, pressure, contact time, and presence of diluents such as hydrogen, steam or nitrogen, if any. Additionally, as presently described, selectivity is a measure of the amount of a particular species in the product, in mole percent, relative to the total moles of the reactant converted. As presently described, catalyst stability is a measure of the rate of change with time of the activity and selectivity parameters, where the smaller the rate change the more stable the catalyst systems.

According to one or more embodiments, selectivity for olefin production may be achieved by the reduction in undesirable reactions such as cracking side reactions and isomerization, which may be enhanced by relatively high temperatures and low hydrogen pressures. For selective dehydrogenation processes presently described, it may be desirable to dehydrogenate normal hydrocarbon feedstocks to produce linear alkenes with little or no simultaneous cracking or isomerization reactions, which tend to produce smaller or branched hydrocarbon chains, respectively. According to one or more embodiments, the isomerization or cracking activity of the presently described dehydrogenation reactions may be maintained at less than 2 mol. % of the feedstock, measured as the number of moles of isomerized or cracked hydrocarbons in the product relative to the feedstock.

In one or more embodiments, a feed stream of the paraffinic naphtha feedstock may be introduced into a reactor that contains the dehydrogenation catalyst system. The feed stream may include the reactant material (for example, C5 and C6 normal alkanes) as well as a diluent component. Examples of diluent materials include hydrogen, steam, methane, inert gases such as argon or nitrogen, or combinations thereof. Without limitation, the weight ratio of diluent to reactant material may be from 500 to 5000, such as from 500 to 1000, from 1000 to 2000, from 2000 to 3000, from 3000 to 4000, from 4000 to 5000, or any combination thereof.

The dehydrogenated product stream exiting the dehydrogenation reactor may include dehydrogenated hydrocarbons, unconverted hydrocarbons that may be identical to the reactant material, cracked products, by-product hydrogen from dehydrogenation reactions, and the diluent material. Diluent gases such as hydrogen may be separated from the other portions of the dehydrogenated product stream. These diluent gases may be recycled to be used again as diluent materials or may be utilized in other chemical processes. The dehydrogenated hydrocarbons and unconverted hydrocarbons may be separated by downstream separation processes as desired. In some embodiments, the unconverted hydrocarbons may then be recycled to the process for subsequent reaction passes.

In some embodiments, the paraffinic naphtha feedstock is carried into the dehydrogenation reactor to be contacted with the catalyst system in a feed stream including a diluent material. In such embodiments, the diluent material in the feed stream may include from 5% to 30% by volume hydrogen, from 5% to 10% by volume hydrogen, from 10% to 15% by volume hydrogen, from 15% to 20% by volume hydrogen, from 20% to 25% by volume hydrogen, or from 25% to 30% by volume hydrogen, or any combination thereof. In some embodiments, this ratio of hydrogen to other diluents may be utilized for the dehydrogenation of C5 to C6 hydrocarbons. In some embodiments, the diluent may include, or consist entirely of hydrogen and an inert gas such as nitrogen. Without being bound by any particular theory, it is believed that the ratio of hydrogen as a diluent increases selectivity for normal alkenes and normal alkene yield under some reaction conditions. Catalyst stability may also be increased with the use of 5% to 30% by volume hydrogen as diluent.

In some embodiments, the methods for processing the paraffinic naphtha feedstock may further include, separating the dehydrogenated process stream into at least a dehydrogenated liquid product and a gas-phase product. The separation may be accomplished by any conventional vapor-liquid separation method in a suitable apparatus such as a depressurizing vessel, a flash drum, a breakpot, a knock-out drum, a knock-out pot, a compressor suction drum, or a compressor inlet drum, for example. In some embodiments, the separation may be accomplished by any conventional method for separating fluidic mixtures of hydrocarbons having varying boiling points such as by distillation, for example. The methods may then further include blending the dehydrogenated liquid product into a gasoline. The gas-phase product may be recovered for use in other refinery processes or as a valuable product.

EXAMPLES

The present invention will be better understood by reference to the following examples, which are offered by way of illustration and which one skilled in the art will recognize are not meant to be limiting.

A paraffinic naphtha sample containing C5-C7 hydrocarbons, the properties and composition of which are shown in Table 1, was used as a paraffinic naphtha feedstock to demonstrate dehydrogenation reactions. Experiments were conducted in a pilot plant with a fixed-bed reactor. The pilot plant was loaded with 20 cm$^3$ of a catalyst containing Ti,Zr-USY zeolite and platinum as active phase metal. The pilot plant was operated at 3 kg/cm$^2$, LHSV of 4 h$^{-1}$, hydrogen to hydrocarbon mole ratio of 3, and at reaction temperatures 475° C., 525° C., and 575° C.

TABLE 1

Composition of paraffinic naphtha feedstock in exemplary dehydrogenation reaction

| Component | Weight percent of Hydrocarbon Components | | | | | |
|---|---|---|---|---|---|---|
| | n-Alkanes | i-Alkanes | Olefins | Cyclo-alkanes | Aromatics | Total |
| C5 | 25.5 | 8.8 | 0.0 | 2.1 | 0.0 | 36.4 |
| C6 | 25.4 | 26.5 | 0.0 | 5.4 | 1.5 | 58.8 |
| C7 | 0.8 | 3.3 | 0.0 | 0.6 | 0.1 | 4.8 |
| Total | 51.7 | 38.6 | 0.0 | 8.1 | 1.6 | 100.0 |

The paraffinic naphtha feedstock and products within the dehydrogenated product stream at three temperatures are summarized in Table 2. The data indicate that n-alkanes are converted to iso-alkanes and olefins over the Ti,Zr-USY zeolite catalyst. The data further suggest that olefin content may increase with increasing temperatures.

TABLE 2

Hydrocarbon components of dehydrogenated product stream for various reaction temperatures

| Process Temperature | Yield (wt. %) | | | |
|---|---|---|---|---|
| | n-Alkanes | iso-Alkanes | Other | Olefins |
| Initial Feed | 51.7 | 38.6 | 9.7 | 0.0 |
| 475° C. | 24.7 | 43.6 | 28.5 | 3.2 |
| 525° C. | 23.1 | 39.1 | 32.3 | 5.5 |
| 575° C. | 24.2 | 39.8 | 29.2 | 6.8 |

Without intent to be bound by theory, it is believed that the acidity of the Ti,Zr-USY zeolite may advantageously benefit the ability of the dehydrogenation system including the Ti,Zr-USY to produce a greater amount of olefins than would be attained from a comparative system incorporating an unmodified USY zeolite catalyst with the same ratio of silica to alumina.

Total acidity was determined by pyridine adsorption and desorption at 150° C. for a comparative unmodified USY zeolite having a silica to alumina ratio of 40 (USY-40) and a Ti,Zr-USY zeolite having a ratio of silica sites to alumina sites also of 40 (Ti,Zr-USY-40). The USY-40 had a total acidity based on 115 micromoles Brønsted acid sites per gram of zeolite and 47 micromoles Lewis acid sites per gram of zeolite. The Ti,Zr-USY-40 had a total acidity based on 149 micromoles per gram Brønsted acid sites per gram of zeolite and 107 micromoles Lewis acid sites per gram of zeolite.

Numbers of strong acid sites in the USY-40 and the Ti,Zr-USY-40 were determined by pyridine adsorption and desorption at 450° C. The USY-40 had strong acid sites based on 27 micromoles Brønsted acid sites per gram of zeolite and 21 micromoles Lewis acid sites per gram of zeolite. The Ti,Zr-USY-40 had strong acid sites based on 36 micromoles Brønsted acid sites per gram of zeolite and 37 micromoles Lewis acid sites per gram zeolite.

Items Listing

Embodiments of the present disclosure include at least the following items, which are not intended to limit the scope of the disclosure as a whole or of the appended claims.

Item 1: A method for processing paraffinic naphtha, the method comprising: contacting a paraffinic naphtha feedstock with a catalyst system in a dehydrogenation reactor, the catalyst system comprising a framework-substituted ultra-stable Y (USY)-type zeolite to produce a dehydrogenated product stream, wherein the framework-substituted USY-type zeolite has a modified USY framework, the modified USY framework comprising a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof.

Item 2: The method of Item 1, wherein the framework-substituted USY-type zeolite contains from 0.01% to 5% by mass substitution atoms, as calculated on an oxide basis, based on the total mass of the framework-substituted USY-type zeolite.

Item 3: The method of Item 1, wherein: the framework-substituted USY-type zeolite contains from 0.01% to 5% by mass substitution atoms, as calculated on an oxide basis, based on the total mass of the framework-substituted USY-type zeolite; and the substitution atoms comprise a combination selected from the group consisting of (a) titanium atoms and zirconium atoms, (b) titanium atoms and hafnium atoms, (c) zirconium atoms and hafnium atoms, and (d) titanium atoms, zirconium atoms, and hafnium atoms.

Item 4: The method of Item 1, wherein: the framework-substituted USY-type zeolite contains from 0.01% to 5% by mass substitution atoms, as calculated on an oxide basis, based on the total mass of the framework-substituted USY-type zeolite; and the substitution atoms comprise titanium atoms and zirconium atoms.

Item 5: The method of any of the preceding Items, wherein the dehydrogenated product stream contains olefins.

Item 6: The method of any of the preceding Items, wherein the dehydrogenated product stream comprises at least 5% by weight olefins, based on the total weight of the dehydrogenated product stream.

Item 7: The method any of the preceding Items, wherein the catalyst system further comprises a support for the framework-substituted USY-type zeolite, the support comprising inorganic oxides selected from the group consisting of alumina, silica-alumina, and combinations thereof.

Item 8: The method of any of the preceding Items, wherein the catalyst system further comprises an acidic support comprising amorphous silica-alumina.

Item 9: The method of any of the preceding Items, wherein the catalyst system further comprises at least one active-phase metal chosen from nickel, molybdenum, tungsten, platinum, palladium, and combinations thereof.

Item 10: The method of any of the preceding Items, wherein the paraffinic naphtha feedstock comprises a paraffin rich hydrocarbons oil having a boiling point range from 36° C. to 175° C.

Item 11: The method of any of the preceding Items, wherein the paraffinic naphtha feedstock comprises a paraffin rich hydrocarbons oil having carbon numbers from 5 to 10.

Item 12: The method of any of the preceding Items, wherein the contacting of the paraffinic naphtha feedstock with the catalyst system is conducted under conditions of: a reaction temperature from 450° C. to 600° C.; a reaction pressure from 1 kg/cm$^2$ to 20 kg/cm$^2$; a liquid hourly space velocity (LHSV) from 0.5 h$^{-1}$ to 8 h$^{-1}$; and a hydrogen to hydrocarbon mole ratio from 1 to 5.

Item 13: The method of any of the preceding Items, wherein the catalyst system further comprises an alumina binder.

Item 14: The method of any of the preceding Items, further comprising: separating the dehydrogenated process stream into at least a dehydrogenated liquid product and a gas-phase product; and blending the dehydrogenated liquid product into a gasoline.

Item 15: The method of any of the preceding Items, wherein the catalyst system is free of any zeolite in addition to the framework-substituted USY-type zeolite.

Item 16: The method of any of the preceding Items, wherein the framework-substituted USY-type zeolite contains from 0.01% to 5% by mass substitution atoms, as calculated on an oxide basis, based on the total mass of the framework-substituted USY-type zeolite.

Item 17: The method of any of the preceding Items, wherein the catalyst system further comprises a support for the framework-substituted USY-type zeolite, the support comprising inorganic oxides selected from the group consisting of alumina, silica-alumina, and combinations thereof.

Item 18: The method of any of the preceding Items, wherein the paraffinic naphtha feedstock comprises a paraffin rich hydrocarbons oil having a boiling point range from 36° C. to 175° C.

Item 19: The method of any of the preceding Items, wherein the contacting of the paraffinic naphtha feedstock with the catalyst system is conducted under conditions of: a reaction temperature from 450° C. to 600° C.; a reaction pressure from 1 kg/cm$^2$ to 20 kg/cm$^2$; a liquid hourly space velocity (LHSV) from 0.5 h$^{-1}$ to 8 h$^{-1}$; and a hydrogen to hydrocarbon mole ratio from 1 to 5.

Item 20: A dehydrogenation catalyst for dehydrogenating a paraffinic naphtha, the dehydrogenation catalyst comprising a framework-substituted ultra-stable Y (USY)-type zeolite, wherein the framework-substituted USY-type zeolite has a modified USY framework, the modified USY framework comprising a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof.

Item 21: The dehydrogenation catalyst of Item 20, wherein the framework-substituted USY-type zeolite contains from 0.01% to 5% by mass substitution atoms, as calculated on an oxide basis, based on the total mass of the framework-substituted USY-type zeolite.

Item 22: The dehydrogenation catalyst of Item 20, wherein: the framework-substituted USY-type zeolite contains from 0.01% to 5% by mass substitution atoms, as calculated on an oxide basis, based on the total mass of the framework-substituted USY-type zeolite; and the substitution atoms comprise a combination selected from the group consisting of (a) titanium atoms and zirconium atoms, (b) titanium atoms and hafnium atoms, (c) zirconium atoms and hafnium atoms, and (d) titanium atoms, zirconium atoms, and hafnium atoms.

Item 23: The dehydrogenation catalyst of Item 20, wherein: the framework-substituted USY-type zeolite contains from 0.01% to 5% by mass substitution atoms, as calculated on an oxide basis, based on the total mass of the framework-substituted USY-type zeolite; and the substitution atoms comprise titanium atoms and zirconium atoms.

Item 24: The dehydrogenation catalyst of any of Items 20 to 23, in combination with a support for the framework-substituted USY-type zeolite, the support comprising inorganic oxides selected from the group consisting of alumina, silica-alumina, and combinations thereof.

Item 25: The dehydrogenation catalyst of any of Items 20 to 24, in combination with an acidic support comprising amorphous silica-alumina.

Item 26: The dehydrogenation catalyst of any of Items 20 to 25, in combination with at least one active-phase metal chosen from nickel, molybdenum, tungsten, platinum, palladium, and combinations thereof.

Item 27: The dehydrogenation catalyst of any of Items 20 to 26, in combination with an alumina binder.

Item 28: Use of the dehydrogenation catalyst of any of Items 20 to 27 to dehydrogenate a paraffinic naphtha.

Item 29: The use of Item 28, wherein the paraffinic naphtha feedstock comprises a paraffin rich hydrocarbons oil having a boiling point range from 36° C. to 175° C.

Item 30: The use of Item 28 or 29, wherein the paraffinic naphtha feedstock comprises a paraffin rich hydrocarbons oil having carbon numbers from 5 to 10.

Item 31: The use of any of Items 28 to 30, including any additional feature of the method for processing paraffinic naphtha according to any of Items 1 to 19.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

While particular embodiments have been illustrated and described herein, it should be understood that various other changes and modifications may be made without departing from the scope of the claimed subject matter. Moreover, although various aspects of the claimed subject matter have been described herein, such aspects need not be used in combination. It is therefore intended that the appended claims cover all such changes and modifications that are within the scope of the claimed subject matter.

What is claimed is:

1. A method for processing paraffinic naphtha, the method comprising:
   contacting a paraffinic naphtha feedstock with a catalyst system in a dehydrogenation reactor, the catalyst system comprising a framework-substituted ultra-stable Y (USY)-type zeolite to produce a dehydrogenated product stream,
   wherein the framework-substituted USY-type zeolite has a modified USY framework, the modified USY framework comprising a USY aluminosilicate framework modified by substituting a portion of framework aluminum atoms of the USY aluminosilicate framework with substitution atoms independently selected from the group consisting of titanium atoms, zirconium atoms, hafnium atoms, and combinations thereof.

2. The method of claim 1, wherein the framework-substituted USY-type zeolite contains from 0.01% to 5% by mass substitution atoms, as calculated on an oxide basis, based on the total mass of the framework-substituted USY-type zeolite.

3. The method of claim 1, wherein:
   the framework-substituted USY-type zeolite contains from 0.01% to 5% by mass substitution atoms, as calculated on an oxide basis, based on the total mass of the framework-substituted USY-type zeolite; and
   the substitution atoms comprise a combination selected from the group consisting of (a) titanium atoms and zirconium atoms, (b) titanium atoms and hafnium atoms, (c) zirconium atoms and hafnium atoms, and (d) titanium atoms, zirconium atoms, and hafnium atoms.

4. The method of claim 1, wherein:
   the framework-substituted USY-type zeolite contains from 0.01% to 5% by mass substitution atoms, as calculated on an oxide basis, based on the total mass of the framework-substituted USY-type zeolite; and
   the substitution atoms comprise titanium atoms and zirconium atoms.

5. The method of claim 1, wherein the dehydrogenated product stream contains olefins.

6. The method of claim 1, wherein the dehydrogenated product stream comprises at least 5% by weight olefins, based on the total weight of the dehydrogenated product stream.

7. The method of claim 1, wherein the catalyst system further comprises a support for the framework-substituted USY-type zeolite, the support comprising inorganic oxides selected from the group consisting of alumina, silica-alumina, and combinations thereof.

8. The method of claim 1, wherein the catalyst system further comprises an acidic support comprising amorphous silica-alumina.

9. The method of claim 1, wherein the catalyst system further comprises at least one active-phase metal chosen from nickel, molybdenum, tungsten, platinum, palladium, and combinations thereof.

10. The method of claim 1, wherein the paraffinic naphtha feedstock comprises a paraffin rich hydrocarbons oil having a boiling point range from 36° C. to 175° C.

11. The method of claim 1, wherein the paraffinic naphtha feedstock comprises a paraffin rich hydrocarbons oil having carbon numbers from 5 to 10.

12. The method of claim 1, wherein the contacting of the paraffinic naphtha feedstock with the catalyst system is conducted under conditions of:
   a reaction temperature from 450° C. to 600° C.;
   a reaction pressure from 1 kg/cm$^2$ to 20 kg/cm$^2$;
   a liquid hourly space velocity (LHSV) from 0.5h$^{-1}$ to 8h$^{-1}$; and
   a hydrogen to hydrocarbon mole ratio from 1 to 5.

13. The method of claim 1, wherein the catalyst system further comprises an alumina binder.

14. The method of claim 1, further comprising:
   separating the dehydrogenated process stream into at least a dehydrogenated liquid product and a gas-phase product; and
   blending the dehydrogenated liquid product into a gasoline.

15. The method of claim 14, wherein the catalyst system is free of any zeolite in addition to the framework-substituted USY-type zeolite.

16. The method of claim 14, wherein the framework-substituted USY-type zeolite contains from 0.01% to 5% by mass substitution atoms, as calculated on an oxide basis, based on the total mass of the framework-substituted USY-type zeolite.

17. The method of claim 14, wherein the catalyst system further comprises a support for the framework-substituted USY-type zeolite, the support comprising inorganic oxides selected from the group consisting of alumina, silica-alumina, and combinations thereof.

18. The method of claim 14, wherein the paraffinic naphtha feedstock comprises a paraffin rich hydrocarbons oil having a boiling point range from 36° C. to 175° C.

19. The method of claim 14, wherein the contacting of the paraffinic naphtha feedstock with the catalyst system is conducted under conditions of:
   a reaction temperature from 450° C. to 600° C.;
   a reaction pressure from 1 kg/cm$^2$ to 20 kg/cm$^2$;
   a liquid hourly space velocity (LHSV) from 0.5 h$^{-1}$ to 8 h$^{-1}$; and
   a hydrogen to hydrocarbon mole ratio from 1 to 5.

* * * * *